INVENTORS
NORMAN BRASLAU
WILTON A. HARDY
BY
*Francis J. Thomas*
ATTORNEY

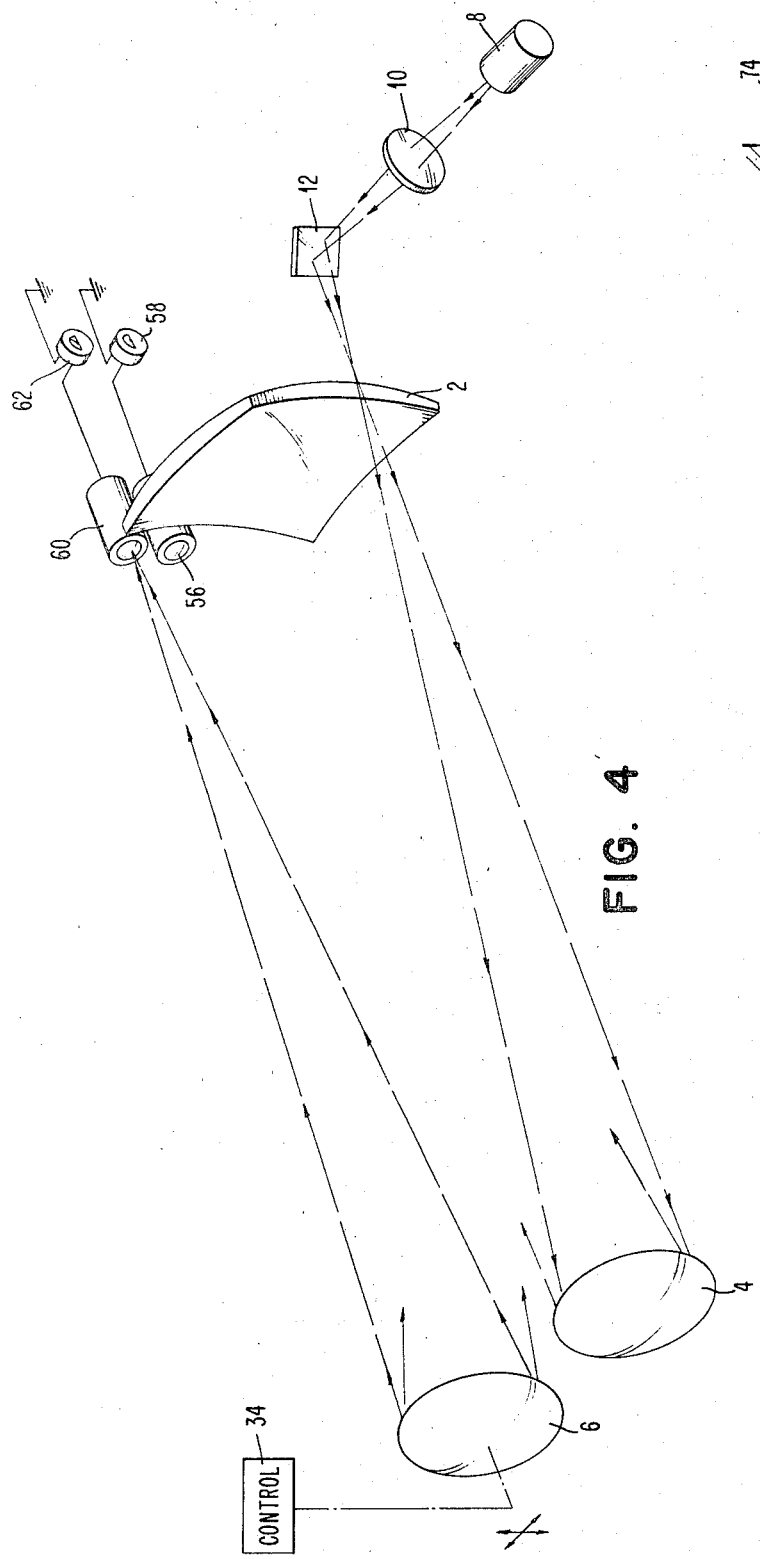
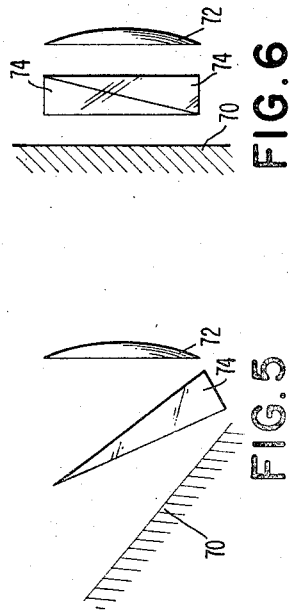
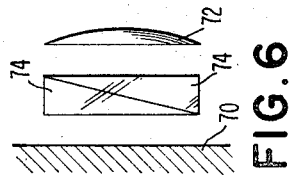
FIG. 4
FIG. 5
FIG. 6

United States Patent Office 3,376,424
Patented Apr. 2, 1968

3,376,424
**OPTICAL POSITIONING DEVICE IN COMBINA-
TION WITH MULTIPLE REFLECTING PLURAL
SPHERICAL MIRRORS**
Norman Braslau, Katonah, and Wilton A. Hardy,
Ossining, N.Y., assignors to International Business Machines Corporation, New York, N.Y.,
a corporation of New York
Filed Dec. 17, 1964, Ser. No. 419,004
32 Claims. (Cl. 250—216)

This invention relates to devices for electro-optically or mechanically positioning an optical image, and, in particular, to photocomposition (data selection), absorption measurement and scanner devices.

In the present invention, several spherical mirrors or their equivalent are arranged to produce multiple reflections of an optical image where the positions of the reflected images can be controlled by the adjustment of one or more mirrors, either physically or by equivalent techniques, such as electro-optical techniques.

An absorption device is described in an article entitled, "Long Optical Paths of Large Aperture," by John U. White in the Journal of the Optical Society of America, vol. 32, page 285, 1942. This device provides a long optical path length by multiple reflections of a beam of light with spherical mirrors. In the present invention, the basic White absorption cell is used as an element of more complex apparatus to provide several optical instruments and devices.

In an embodiment of a photocomposition device, a spot of light is controllably positioned by adjustment of one or more reflectors to select one of a group of character masks. The resulting image of the mask is then reinserted into the optical system to cause this image to be produced at a predetermined output position that is independent of the selected mask.

In another embodiment, an improved absorption cell is provided by multiply-reflecting the input image until it emerges from the system and then reinserting the emergent image for further reflection by the system until it again emerges at a fixed exit position. In this embodiment, the reflectors are not adjusted during operation, but are positioned so as to determine the total optical path through the apparatus.

In a third embodiment, a measurement device is provided wherein the position of the emerging image of a spot of light is sensed in order to determine the orientation of the reflectors. The motion (or equivalent) of the reflectors is effectively amplified by the multiple reflections, permitting extremely small motions to be measured.

In a fourth embodiment, a scanner is provided wherein the emerging spot of light is caused to traverse a predetermined path in accordance with movement (or the equivalent) of a reflector. The spot of light is imaged upon the pattern to be scanned and photodetection apparatus is used to sense the configuration of this pattern as a function of the intensity of the light that is transmitted by the pattern during the scan.

Although the reflectors are embodied either with spherical mirrors or with flat mirrors and lenses, any type of reflective apparatus having an effective center of curvature can be employed.

It is, thus, an object of the present invention to provide optical devices which employ multiple reflections of an input image for selection, absorption, measurement, and scanner devices.

Another object of the invention is to provide an optical selection device employing several reflectors having effective centers of curvature that are controllably arranged to cause a multiply-reflected applied image to be directed toward a predetermined mask, and employing additional optical apparatus for causing the masked image to be reinserted for further multiple reflections so that the masked image emerges from the device at a predetermined position that is independent of the position of the selected mask.

A further object of the present invention is to provide and optical absorption device employing several reflectors having effective centers of curvature that are arranged to cause an applied image to undergo multiple reflections and then emerge, and employing additional optical apparatus for causing the emergent image to be reinserted for further multiple reflections, after which an image emerges at a predetermined position which is independent of the relative positions of the effective centers of curvature of the reflectors.

A further object of the present invention is to provide an optical measurement device employing several reflectors having effective centers of curvature that are controllably arranged to cause an applied image to undergo multiple reflections and then emerge at a position that is dependent upon the relative positions of the effective centers of curvature of the reflectors, wherein a small change in these relative positions causes an amplified change of the emergent image.

A further object of the present invention is to provide an optical scanner device employing several reflectors having effective centers of curvature that are controllably arranged to cause an applied image to undergo multiple reflections and then emerge at a position that is dependent upon the relative positions of the effective centers of curvature of the reflectors, wherein the emerging image scans a path that is determined by the time-varying relative positions of these effective centers of curvature.

The foregoing and other objects, features and advantages of the invention will be apparent from the following more particular description of preferred embodiments of the invention, as illustrated in the accompanying drawings.

FIG. 4 is a diagram showing an optical measurement and scanner apparatus.

FIGS. 5 and 6 are diagrams showing electro-optical deflection apparatus that is suitable for use in the embodiments of FIGS. 1 and 4.

Figure 1:
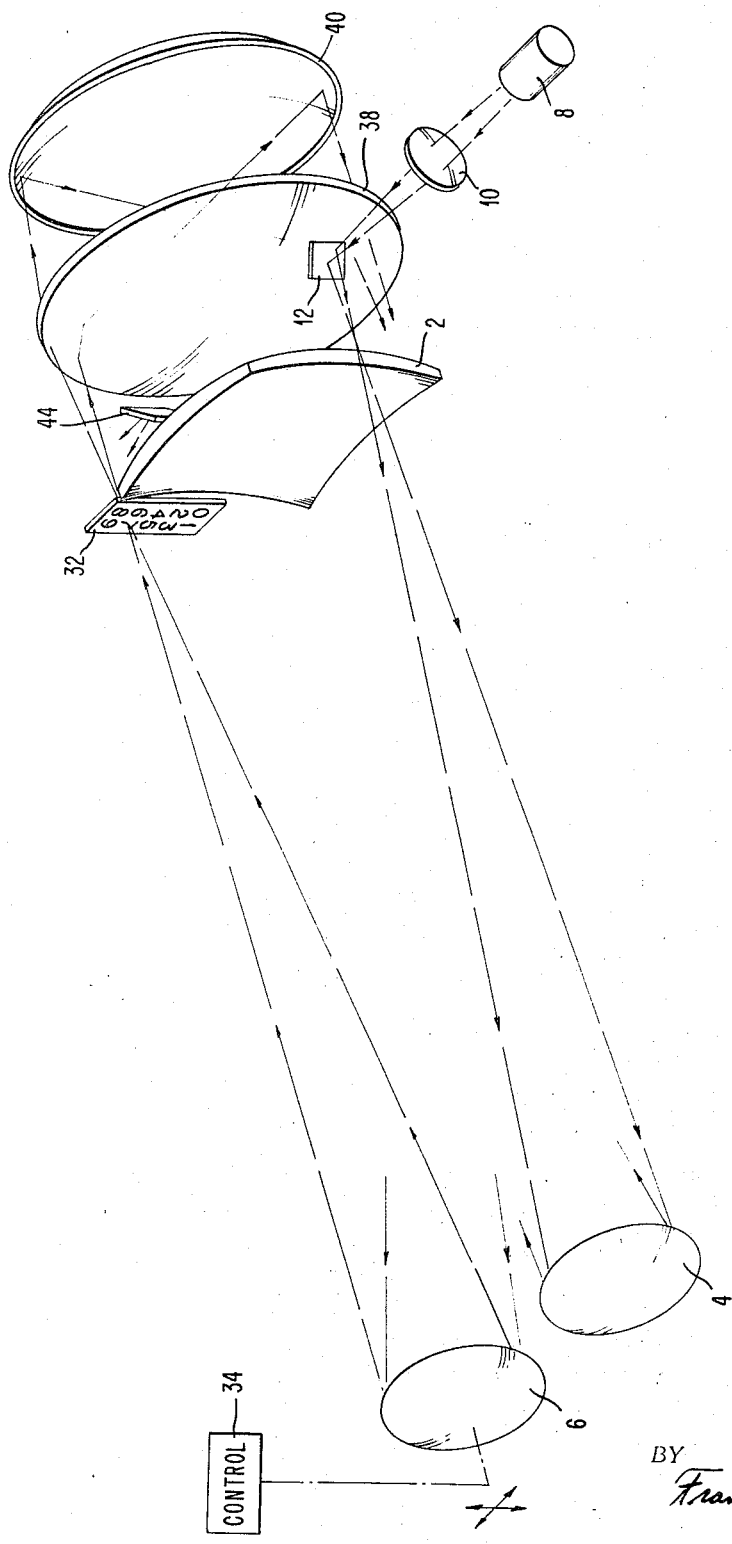
FIG 1 is a digram showing an optical data selection or absorption apparatus.

In the data selection device shown in FIG. 1, three spherical mirrors 2, 4, 6 are arranged to cause an image in the plane of mirror 2 to be alternately reflected by mirrors 4 and 6 back to mirror 2. The mirrors are arranged such that each reflected image appears on mirror 2 at a different location, but all images are in focus and identical in size and configuration except for spherical aberration. Mirror 2 has a radius of curvature and position which places its center at a point between mirrors 4 and 6. Mirrors 4 and 6 have equal radii of curvature which equal the radius of curvature of mirror 2. These mirrors are positioned to place their centers at different positions on the face of mirror 2. As illustrated in the front view of mirror 2 (FIG. 2), the center of curvature of mirror 4 ($C_4$), is located on the righthand side of the horizontal axis of mirror 2, and the center of curvature of mirror 6 ($C_6$), is located in the upper-left quadrant of mirror 2.

In FIG. 1, a source of light 8 is directed through a lens 10 and reflected by a mirror 12 to form a real image in the plane of mirror 2. This image is shown diagrammatically in FIG. 2 to be a square image 14 in the plane of mirror 2 along the horizontal axis (although the image is not perceptible in the absence of a screen). This image is reflected by mirror 4 to form a real (and visible) image 16 on the horizontal axis of mirror 2 and a distance from $C_4$ equal to the distance between image 14 and $C_4$. This image 16 is then reflected by mirror 6 to form another real image 18 on mirror 2. Image 18 is located above the horizontal axis because the center of curvature of mirror 6 is directed above the axis to $C_6$. The image 18 is on line with image 16 and $C_6$ and an equal distance from $C_6$. The image 18 is then reflected by mirror 4 to form another real image 20 on line with image 18 and $C_4$ and an equal distance from $C_4$. In the same manner, mirrors 4 and 6 alternately form successive images 22, 24, 26, etc. on mirror 2. After the desired number of reflections, an image 28 on mirror 2 is reflected by mirror 6 to produce a real image 30 which is in the plane of mirror 2 but outside of its area. The image 30 is outside the area because it is on line with image 28 and $C_6$ and equally distant from $C_6$. It will be noted that the images 14, 18, 22, 26 and 30 fall on a straight line 31 and images 16, 20, 24 and 28 fall in a second straight line 33 which is parallel line 31. A character mask 32 containing, by way of example, the ten digits, is located in the plane of mirror 2. The image 30 is formed on the mask in the area of one of the ten characters, where the selection of the character is dependent upon the positioning of the mirrors. In the illustrative example shown in FIG. 2, the character "7" is selected because the centers of curvature $C_4$ and $C_6$ of mirrors 4 and 6 are arranged such that the fourth reflection by mirror 6 forms an image on the character "7." Although both mirrors 4 and 6 can be adjusted to provide character selection, in the preferred embodiment of the invention, mirror 6 alone is adjusted by a mechanical means 34 (FIG. 1) which provides controllable lateral motion in two dimensions. Although rotational motion would be theoretically preferable, lateral motion is sufficient because of the extremely small amounts of motion that occur. Rotational motion can be employed by arranging one of the mirrors 4 and 6 such that it can be tilted in two dimensions or, preferably, by arranging each of these mirrors so that it can be tilted in one of the two dimensions (one mirror can be tilted vertically and the other horizontally).

As an alternative embodiment, the mirrors 4 and 6 can be maintained at fixed positions, and the motion can be effected by the use of electro-optical deflecting devices, such as described in an article entitled Light Beam Deflection Using the Kerr Effect in Single Crystal Prisms of $BaTiO_3$ by W. Haas, R. Johannes, and P. Cholet in Applied Optics, vol. 3, No. 8, August 1964, at pp. 988–989. Preferably, mirror 4 is replaced by the optically-equivalent flat mirror and lens of FIG. 5 or 6, to be described subsequently, to avoid optical aberrations when used with electro-optical deflectors.

The position of each reflected image on mirror 2 is a function of the positions of the centers of curvatures $C_4$ and $C_6$ of mirrors 4 and 6 and the applied image 14, designated $I_a$. When the coordinates of $C_4$ are $(x_1, y_1)$ those of $C_6$ are $(x_2, y_2)$, and those of $I_a$ are $(x_a, y_a)$, then the emerging $n$th image $I_n$ (the result of an even number of reflections, $n$) is formed at $(x_n, y_n)$, according to:

$$x_n = x_a - n(x_1 - x_2)$$
$$y_n = y_a - n(y_1 - y_2)$$

Since $y_a$ and $y_1$ equal zero in the preferred embodiment, $y_n = ny_2$. The intensity $I_n$ of the $n$th image equal $I_a R^{2n}$ where $I_a$ corresponds to the intensity of the applied image and R equals the reflectivity of the mirrors.

Referring to FIG. 1, the mask (character) that is selected by the emerging image is applied through a field lens 38 to a spherical mirror 40 which produces a real image in the plane of mirror 2. As shown in FIG. 3, this image, the digit 7 in this example, occurs at a position 14, opposite to the position of the selected character; i.e., the character 7 in the mask 32, is imaged at 14' which is on line with image 30 and the x-y axis intersection and at an equal distance from the x-y axis intersection. The digit 7 is shown in a dotted outline box representative of the original image 14, for clarity of understanding. It also will be noted that the prime numbers 14', 16', 18', 20', 22', 24', 26', 28', and 30' are analogous respectively to the introduced image 14 in FIG. 2, the subsequent reflections {first (16), second (18), third (20), fourth (22), fifth (24), sixth (26) and seventh (28)} of the introduced image 14 and the exit image 30. The masked image is thus reinserted into the system and, after multiple reflections, forms a real image 30', in the plane of mirror 2 at a position $(-x_a, 0)$ opposite to the position 14, $(x_a, 0)$, of the applied image. The same optical arrangement which causes the applied image 14 ($I_a$) to be eventually reflected upon the mask 32, produces an identical effect upon the reinserted masked image. Referring to FIG. 3, the input image 14' is reflected from the mirror 4 and forms an image 16' in line with and equally distant from $C_4$. The image 16' is reflected by mirror 6 to form an image 18' in line with and equally distant from $C_6$. Mirror 4 thereafter reflects to form images 20', 24' and 28' interspersed with mirror 6 reflected images 22' and 26'. Finally, mirror 6 reflects image 28' to the exit position 30'. Thus, the masked image is finally formed at a position that is independent of the position chosen on the mask. That is, regardless of which character is selected from the mask 32, the reference beam is inserted at point 14 and the ultimate image exits at point 30'.

Figure 2:
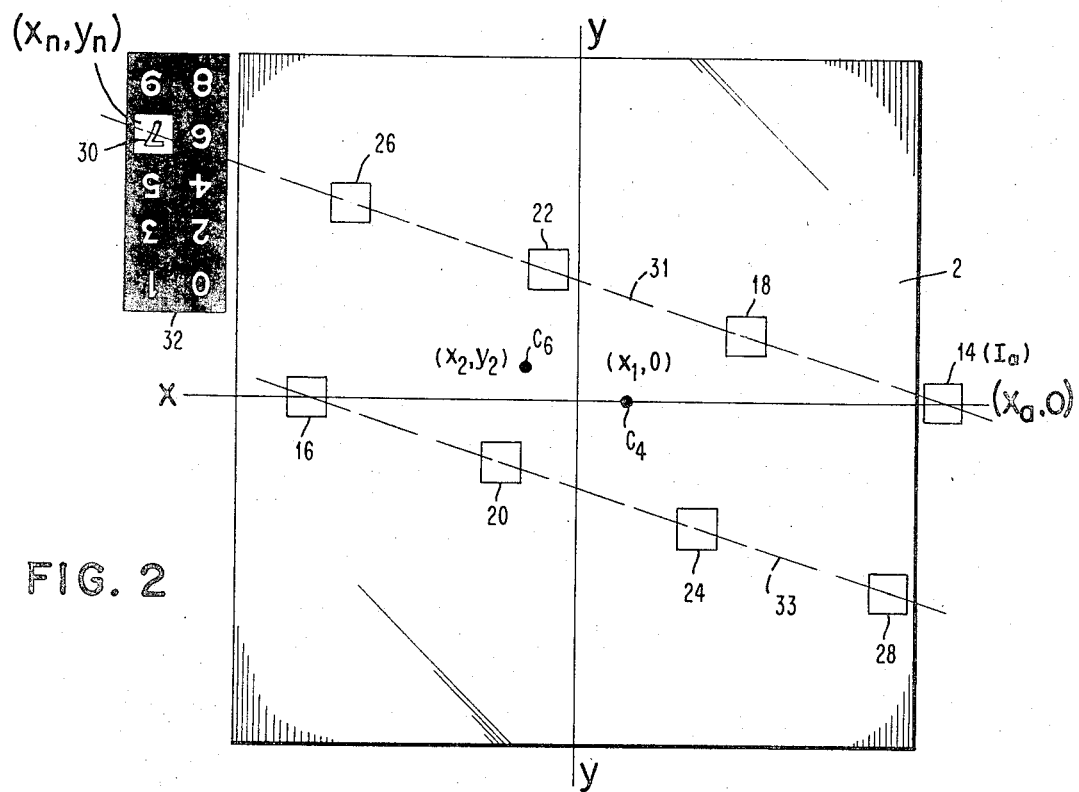
FIGS. 2 and 3 are explanatory diagrams illustrating certain properties of the apparatus shown in FIG. 1.
Figure 3:
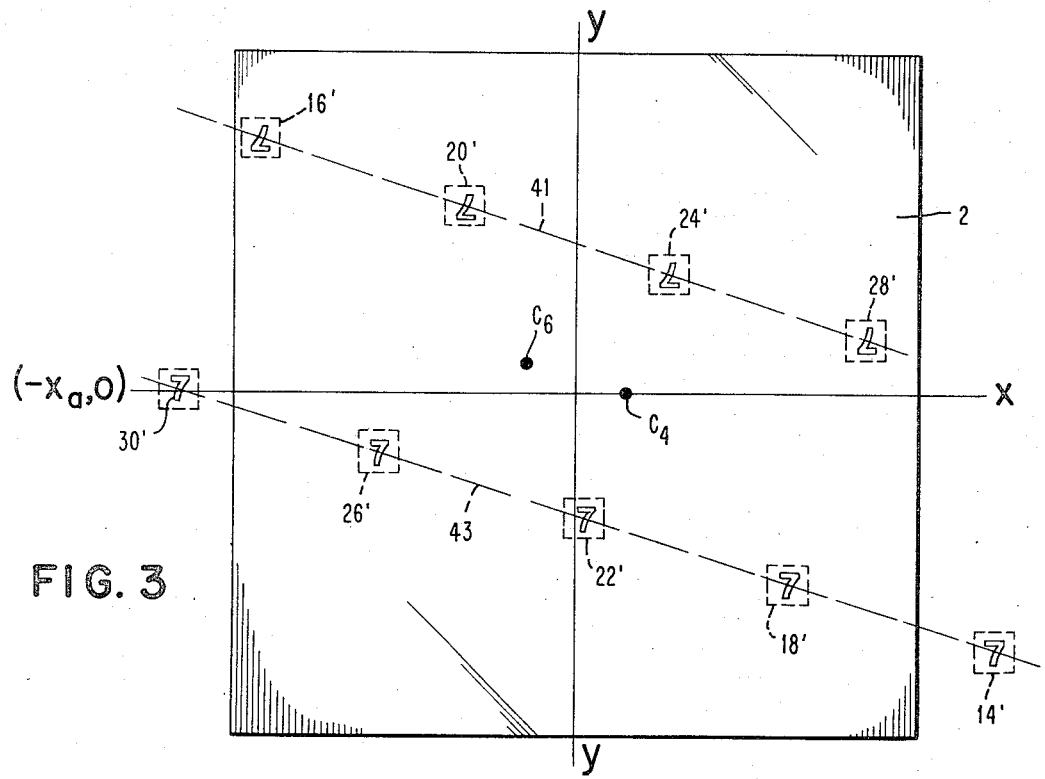

It will be noted that, as in the case of the images in FIG. 2, the images in FIG. 3 also fall on two parallel straight lines 41 and 43 which are parallel to and displaced from lines 31 and 33.

The resulting image is available for display by the use of a screen or can be applied through additional optical apparatus for other uses, such as in a photocomposition system. In FIG. 1, the image is reflected by a mirror 44 to such a utilization system. In order to provide a non-inverted output image, the mask 32 contains inverted digits.

For simplicity, the above-described apparatus provides only eight reflections in the plane of mirror 2. However, excellent results can be obtained using as many as 50 reflections in a system employing mirrors of 4.7 cm. diameter, and a 1 meter radius of curvature. In the preferred embodiment, a gas laser is employed to obtain a high intensity but, obviously, any source of light having the desired properties can be used. Dielectrically control mirrors are employed with reflectivities in the order of 0.99 to prevent attenuation of the image intensity. The use of a laser or other monochromatic source had the added advantage of enabling the dielectric coating of the mirrors to be selected for maximum reflectivity.

In a second embodiment of the invention, an optical absorption device employs three spherical mirrors and reinsertion apparatus to cause the applied image to be multiply reflected, reinserted, again multiply reflected, and finally caused to emerge at a predetermined position.

Absorption devices are used primarily for absorption spectroscopy and for certain measurements where long path lengths are required. In the above-described White absorption device, multiple reflections are obtained, but only during one phase of operation. In the present invention, the emerging image is reinserted for another phase of operation to double the total number of reflections and thus at least double the optical absorption path length.

This embodiment of the invention uses an apparatus which is identical to the apparatus shown in FIG. 1 except that the character mask 32 is removed and the emerging image is returned to the system without modification. The positions of the centers of curvature $C_4$ and $C_6$ (FIG. 2) are established to control the number of traverses of the system. Since the position of the finally emerging image is not dependent upon the positions of mirrors 4 and 6, vibrations of these mirrors do not adversely affect the operation of the absorption device (in contrast to the White device whose operation requires that the mirrors be carefully mounted to avoid vibration).

Although only two phases of multiple reflections are shown in FIG. 1, additional phases can obviously be employed by simply reinserting the output image 42 at any position other than the positions at which the image was applied (or reinserted) or emerged during the previous two phases of operation. The additional reinsertions can be accomplished by the use of conventional lenses and mirrors.

In a third embodiment of the invention, an optical measurement or scanner device employs three spherical mirrors and photo-detection devices. In the case of a measurement device, as shown in FIG. 4, a spot of light is applied to the device and the emerging image is not reinserted for further reflections, but rather, its position is sensed. The apparatus operates in the same manner as described above with respect to FIG. 1 to the point where an image first emerges. Two photodetectors 56 and 60 are located near mirror 2. The mirrors are initially arranged such that the emerging image is positioned on photodetector 56, producing an electrical signal to a meter 58. Mirror 6 is then moved until the emerging beam is positioned on photodetector 60, producing an electrical signal to a meter 62. In this manner, a movement of mirror 6 can be measured by observation of meters 58 and 62. The locations of the photodetectors are predetermined and depend upon the desired mirror movement which is to be measured, in accordance with the above equations. Extremely precise measurements of the movement of the mirror can be readily made because of the amplification of position that is caused by the multiple reflections without concurrent enlargement of the image size. Obviously, this system can be extended by the use of apertures, photodetectors and meters, or the meters can be replaced with other indicating devices, such as alarms. In one such extension, four photodetectors are arranged in the vicinity of the emerging beam, where one is mounted above, one below, one to the left and one to the right of the center of the beam. By connecting the upper and lower photodetector devices to one difference amplifier, and the left and right devices to another difference amplifier, precise measurements of the position of the image can be derived. Alternatively, an array of closely-spaced apertures and photodetector devices can be employed for precise measurements.

The embodiment of FIG. 3 can also be used as a scanner by applying a spot of light and placing a pattern to be scanned before the photodetectors. The pattern may consist of binary data elements, alphanumeric characters, a fingerprint, a map, a photograph, or any other data. When used as a scanner, the mirror (or mirrors) is moved along a predetermined path or raster to cause predetermined movements of the scanning image across the pattern to be scanned. One or more photodetectors are arranged behind the pattern to produce electrical signals that are representative of the pattern.

A flat mirror and a lens is the well-known equivalent of a spherical mirror. In FIGS. 5 and 6, mirrors 70 and lenses 72 are employed in conjunction with electro-optical deflectors 74 of the type described in the article by Haas, Johannes and Cholet. A single electro-optical prism is shown in FIG. 5 and the lens and mirror are positioned at angles which cause light that enters the lens to be reflected back upon itself when no electric signal is applied. When an electric signal is applied to the front and back faces of the deflector 74 on leads (not shown), the index of refraction of the deflector is altered and light emerges at a different angle from the angle at which it is applied. Two deflectors 74 are arranged between the lens 72 and the flat mirror 70 in FIG. 6. With this configuration, the lens is parallel to the mirror, as the zero-signal deflection by one deflector counteracts the deflection by the other. Electric signals of opposite polarity are applied to the deflectors when the light is to be deflected (or one deflector can be uncontrolled). Obviously, the components need not be spaced apart as shown in FIG. 6. The lenses and prisms are coated for maximum transmission at the frequency of the source light.

Thus, multiple-reflection apparatus has been shown and described wherein the positions of an emergent image is dependent upon the relative positions of the effective centers of curvature of reflectors.

While the invention has been particularly shown and described with reference to preferred embodiment thereof, it will be understood by those skilled in the art that the foregoing and other changes in form and details may be made therein without departing from the spirit and scope of the invention.

What is claimed is:

1. An optical image selection device comprising, in combination:
    means for providing an input optical image;
    a plurality of reflecting means having effective centers of curvature that are arranged to multiply reflect the input image without distorting its shape;
    a plurality of partially-transmitting masks;
    and means for adjusting the effective center of curvature of at least one of the reflecting means to cause the various reflected images to be controllably positioned, wherein a predetermined image is positioned at a selected mask.

2. The apparatus described in claim 1, wherein three reflecting means are arranged to cause images to be formed on a first of the reflecting means by alternate reflections of the two other reflecting means.

3. The apparatus described in claim 2, wherein the first reflecting means is a spherical mirror whose center of curvature is located between the two other reflecting means, and wherein the effective centers of curvature of said two other reflecting means are approximately on the surface of the first reflecting means at different positions.

4. The apparatus described in claim 3, wherein said two other reflecting means are spherical mirrors, the center of curvature of at least one of which is adjustable by physically altering its position.

5. The apparatus described in claim 3, wherein at least one of said two other reflecting means employs electro-optical deflection to alter its effective center of curvature.

6. The apparatus described in claim 5, wherein the reflecting means employing electro-optical deflection comprises a flat mirror, a lens and an electro-optical deflector.

7. An optical image selection device comprising, in combination:
    means for providing an input optical image;
    a plurality of reflecting means having effective centers of curvature that are arranged to multiply reflect the input image without distorting its shape;
    a plurality of partially-transmitting masks;
    means for adjusting the effective center of curvature of at least one of the reflecting means to cause the various reflected images to be controllably positioned, wherein a predetermined image is positioned at a selected mask to produce an image of the mask;
    and means for reinserting the masked image into the device for multiple reflections along different paths than were traversed by the input image;
    whereby the image of the mask is provided at a predetermined position that is independent of the location of the selected mask.

8. The apparatus described in claim 7, wherein three reflecting means are arranged to cause images to be formed on a first of the reflecting means by alternate reflections of the two other reflecting means.

9. The apparatus described in claim 8, wherein the first reflecting means is a spherical mirror whose center of curvature is located between the two other reflecting means and wherein the effective centers of curvature of said two other reflecting means are on the surface of the first reflecting means at different positions.

10. The apparatus described in claim 9, wherein said two other reflecting means are spherical mirrors, the center of curvature of at least one of which is adjustable by physically altering its position.

11. The apparatus described in claim 9, wherein at least one of said two other reflecting means employs electro-optical deflection to alter its effective center of curvature.

12. The apparatus described in claim 11, wherein the reflecting means employing electro-optical deflection comprises a flat mirror, a lens and an electro-optical deflector.

13. The apparatus described in claim 7, wherein the reinsertion means comprises a reflecting means having an effective center of curvature.

14. The apparatus described in claim 13, wherein the reflecting means in the reinsertion means comprises a spherical mirror.

15. An optical absorption device comprising, in combination:
  means for providing an input optical image;
  a plurality of reflecting means having effective centers of curvature that are arranged to multiply reflect the input image without substantially distorting its shape;
  and means responsive to an emerging image for reinserting the image into the device for multiple reflections along different paths than were traversed by the originally-applied image.

16. The apparatus described in claim 15, wherein three reflecting means are arranged to cause images to be formed on a first of the reflecting means by alternate reflections of the two other reflecting means.

17. The apparatus described in claim 16, wherein the first reflecting means is a spherical mirror whose center of curvature is located between the two other reflecting means, and wherein the effective centers of curvature of said two other reflecting means are approximately on the surface of the first reflecting means at different positions.

18. The apparatus described in claim 17, wherein the three reflecting means are spherical mirrors.

19. The apparatus described in claim 15, wherein the reinsertion means comprises a reflecting means having an effective center of curvature.

20. The apparatus described in claim 19, wherein the reflecting means in the reinsertion means comprises a spherical mirror.

21. An optical measurement device comprising, in combination:
  means for providing an input optical image;
  a plurality of reflecting means having effective centers of curvature that are arranged to multiply reflect the input image without substantially distorting its shape;
  means for adjusting the effective center of curvature of at least one of the reflecting means to cause the various reflected images to be controllably positioned at locations which represent amplifications of the change in the effective center of curvature;
  and means responsive to at least one of the reflected images for providing an indication of this change in the effective center of curvature.

22. The apparatus described in claim 21, wherein three reflecting means are arranged to cause images to be formed on a first of the reflecting means by alternate reflections of the two other reflecting means.

23. The apparatus described in claim 22, wherein the first reflecting means is a spherical mirror whose center of curvature is located between the two other reflecting means, and wherein the effective centers of curvature of said two other reflecting means are approximately on the surface of the first reflecting means at different positions.

24. The apparatus described in claim 23, wherein said two other reflecting means are spherical mirrors, the center of curvature of at least one of which is adjustable by physically altering its position.

25. The apparatus described in claim 24, wherein the means responsive to at least one of the reflected images employs photodetection apparatus.

26. An optical scanner device comprising, in combination:
  means for providing an input light image;
  a plurality of reflecting means having effective centers of curvature that are arranged to multiply reflect the input image without substantially distorting its shape;
  and means for controlling the effective center of curvature of at least one of the reflecting means to cause the various reflected images to be controllably positioned at locations which represent amplifications of the change in the effective center of curvature;
  whereby an emerging image traverses a predetermined scanning pattern.

27. The apparatus described in claim 26, wherein three reflecting means are arranged to cause images to be formed on a first of the reflecting means by alternate reflections of the two other reflecting means.

28. The apparatus described in claim 27, wherein the first reflecting means is a spherical mirror whose center of curvature is located between the two other reflecting means, and wherein the effective centers of curvature of said two other reflecting means are approximately on the surface of the first reflecting means at different positions.

29. The apparatus described in claim 28, wherein said two other reflecting means are spherical mirrors, the center of curvature of at least one of which is adjustable by physically altering its position.

30. The apparatus described in claim 28, wherein at least one of said two other reflecting means employs electro-optical deflection to alter its effective center of curvature.

31. The apparatus described in claim 30, wherein the reflecting means employing electro-optical deflection comprises a flat mirror, a lens and an electro-optical deflector.

32. The apparatus described in claim 28, wherein the emerging image passes a region to be scanned and then impinges upon photodetection apparatus.

No references cited.

RALPH G. NILSON, *Primary Examiner.*

T. N. GRIGSBY, *Assistant Examiner.*